(12) United States Patent
Funabashi

(10) Patent No.: US 6,339,225 B1
(45) Date of Patent: Jan. 15, 2002

(54) METHOD FOR ERASING A RESIDUAL RADIATION IMAGE

(75) Inventor: Makoto Funabashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/327,539

(22) Filed: Jun. 8, 1999

(30) Foreign Application Priority Data

Jun. 8, 1998 (JP) .......................................... 10-175383

(51) Int. Cl.$^7$ ................................................. G01N 23/04
(52) U.S. Cl. ..................................................... 250/588
(58) Field of Search .......................................... 250/588

(56) References Cited

U.S. PATENT DOCUMENTS 5,550,386 A * 8/1996 Kojima et al. ............... 250/588
6,140,663 A * 10/2000 Neary et al. ................. 250/588

* cited by examiner

*Primary Examiner*—Robert H. Kim
*Assistant Examiner*—Jurie Yun
(74) *Attorney, Agent, or Firm*—Sughrue Mion, PLLC

(57) ABSTRACT

A method for erasing a radiation image remaining in a stimulable phosphor sheet in which a radiation image was recorded and then read by applying stimulating rays onto the phosphor sheet and collecting stimulated emission from the phosphor sheet is performed by applying onto the stimulable phosphor sheet an erasing light containing essentially no light of a wavelength of shorter than 370 nm.

9 Claims, 4 Drawing Sheets

METHOD FOR ERASING A RESIDUAL RADIATION IMAGE

FIELD OF THE INVENTION

The present invention relates to a method for erasing a radiation image remaining in a stimulable phosphor sheet employed in a radiation image recording and reproducing method utilizing a stimulable phosphor.

BACKGROUND OF THE INVENTION

As a method replacing a conventional radiography, a radiation image recording and reproducing method utilizing a stimulable phosphor was proposed, and has been practically employed. The radiation image recording and reproducing method employs a stimulable phosphor sheet (i.e., radiation image storage panel) comprising a stimulable phosphor, and comprises the steps of causing the stimulable phosphor of the phosphor sheet to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The sheet thus treated is subjected to a step for erasing a radiation image remaining therein, and then stored for the next recording and reproducing procedure. Thus, the stimulable phosphor sheet can be repeatedly employed.

In the above method, a radiation image is obtainable with a sufficient amount of information by applying a radiation to the object at a considerably smaller dose, as compared with a conventional radiography using a combination of a radiographic film and radiographic intensifying screen. Further, the method is very advantageous from the viewpoints of conservation of resource and economic efficiency because the stimulable phosphor sheet can be repeatedly used while the radiographic film is consumed for each radiographic process in the conventional radiography.

The stimulable phosphor sheet has a basic structure comprising a support and a stimulable phosphor layer provided thereon. If the phosphor layer is self-supporting, the support may be omitted. The phosphor layer usually comprises a binder and stimulable phosphor particles dispersed therein, but it may consist of agglomerated phosphor without binder. The phosphor layer containing no binder can be formed by deposition process or firing process. Further, the layer comprising agglomerated phosphor soaked with a polymer is also known. In any types of phosphor layers, the stimulable phosphor emits stimulated emission when excited with stimulating rays after having been exposed to a radiation such as X-rays. Accordingly, the radiation having passed through an object or radiated from an object is absorbed by the phosphor layer of the stimulable phosphor sheet in an amount proportional to the applied radiation dose, and a radiation image of the object is produced in the sheet in the form of a latent image (i.e., radiation energy-stored image). The radiation energy-stored image can be released as stimulated emission by sequentially irradiating the phosphor sheet with stimulating rays. The stimulated emission is then photoelectrically detected to give electric signals, so as to reproduce a visible image from the electric signals. On the free surface (surface not facing the support) of the phosphor layer, a protective film is generally placed to keep the phosphor layer from chemical deterioration or physical damage.

The radiation image recording and reproducing method can be performed by means of an all-in-one type apparatus comprising recording means (by which a radiation image is recorded on the phosphor sheet), reading means (by which the image recorded in the phosphor sheet is read by the steps of exciting the stimulable phosphor with stimulating rays to release stimulated emission and photoelectrically detecting the emission), erasing means (by which the radiation image remaining in the phosphor sheet is erased with an erasing light), and conveying systems connecting each means for conveying the phosphor sheet. The above-mentioned means may be separated into two apparatuses, namely a recording apparatus comprising the recording means and a reading apparatus comprising the reading means and the erasing means.

It is preferred that the radiation image recording and reproducing method shows a high sensitivity and gives a radiation image of good quality such as high sharpness and good graininess.

The erasing step is performed to prevent a radiation image to be produced in the next run of the radiation image recording and reproducing procedure from deterioration which is caused by radiation energy still remaining in the phosphor sheet after the radiation image reading procedure is complete, and/or radiation energy brought by radioisotope contaminants in the phosphor sheet or environmental radioactive substance.

The erasing step should be performed as efficiently as possible. In more detail, the erasing step should be performed in a period of time as shorter as possible, using a smaller amount of energy (as to consumed electric power). Moreover, the stimulable phosphor sheet having been subjected to the erasing step should have a small value in the erasure value which is defined in terms of a value of (amount of stimulated emission after the erasing step)/(amount of stimulated emission before the erasing step), should give little reappearance of the previously formed radiation image, and should show little fogging under exposure to ultraviolet rays.

In order to satisfy the above-mentioned requirements, various erasing methods have been heretofore proposed. For instance, Japanese Patent Publication (examined) H1-59566 discloses the use of a stimulable phosphor sheet containing a visible to infrared light-absorbing stimulable phosphor in combination with an optical filter for cutting a light of a shorter wavelength in the erasing procedure so that the phosphor sheet can be free from UV fogging (which means absorbing a light of a wavelength region shorter than its stimulating wavelength region). Japanese Patent publication (examined) H3-79696 discloses the use of an erasing light source such as a white light fluorescent lamp which emits a light in the wavelength region of 400 to 600 nm but does not emit a light in the infrared region. Japanese Patent Provisional Publication 63-97939 describes employment of a fluorescent lamp and a ultraviolet ray-removing filter (i.e., filter absorbing more than 80% of a light of a wavelength of shorter than 440 nm) in combination.

Each of Japanese Patent Provisional Publications H4-1746, H5-119412 and H5-216142 describes a procedure comprising a first erasing step of applying a light which contains a light in the ultraviolet region (200–400 nm) and a second erasing step of applying a light which contains no light of the ultraviolet region, so as to remove a residual radiation image comprising electrons not only at a shallow level but also at a deep level. Japanese Patent Provisional Publication H4-156533 describes a procedure comprising a first erasing step of applying a light of approximately 400 nm and a longer wavelength region (for prevention of UV fogging) and a second erasing step of applying a light containing no light of approximately 600 nm and a shorter wavelength region.

SUMMARY OF THE INVENTION

The present inventor has noted that a stimulable phosphor sheet containing a halogen atom-containing stimulable phosphor such as a stimulable europium or cerium activated alkaline earth metal halide phosphor gradually lowers in its sensitivity when the erasing procedure employing a light containing a light of a ultraviolet region (which is an effective erasing procedure) is repeatedly applied to the stimulable phosphor sheet.

Accordingly, it is an object of the invention to provide a method for efficiently erasing a residual radiation image which remains in a stimulable phosphor sheet having been subjected to the reading procedure, without lowering of the sensitivity.

As a result of further study, the inventor has discovered that the lowering of sensitivity of the stimulable phosphor sheet is caused by coloring (i.e., yellowing) of the phosphor sheet with halogen released from the stimulable phosphor crystals. The release of halogen is caused by accumulation of energy of the applied ultraviolet rays. The inventor has continued the study, and found that the lowering of sensitivity caused by the deterioration of the stimulable phosphor crystals can be effectively prevented by removing a light of a shorter wavelength region from the erasing light in the ultraviolet to visible region, particularly, by removing line spectrum of mercury in the wavelength region of shorter than 370 nm when a fluorescent lamp is employed as the source of erasing light.

The present invention resides in a method for erasing a radiation image remaining in a stimulable phosphor sheet in which a radiation image was recorded and then read by applying stimulating rays onto the phosphor sheet and collecting stimulated emission from the phosphor sheet, comprising a step of applying onto the stimulable phosphor sheet an erasing light containing essentially no light of a wavelength of shorter than 370 nm.

Preferred embodiments of the invention are described below.

(1) The erasing light contains a light of a wavelength region of 370 to 500 nm.

(2) The erasing method comprises a further step (i.e., second erasing step) applying onto the phosphor sheet an erasing light containing essentially no light of a wavelength of shorter than 500 nm.

(3) The erasing light is emitted by a fluorescent lamp and then transmitted through a ultraviolet ray-removing filter.

(4) The erasing light is emitted by a light source emitting neither a light of ultraviolet region nor a light of infrared region.

(5) The erasing light in the further step (i.e., second erasing step) and the erasing light in the previous step (i.e., first erasing step) are applied to the phosphor sheet in a ratio of light amount of 15/85 to 45/55.

(6) The stimulable phosphor sheet contains a stimulable halogen-containing phosphor.

(7) The stimulable phosphor sheet contains a stimulable europium or cerium activated alkaline earth metal halide phosphor.

DETAILED DESCRIPTION OF THE INVENTION

The erasing method of the invention is described in the preferred procedure which comprises two sequential erasing steps, by referring to the attached drawings.

Figure 1:
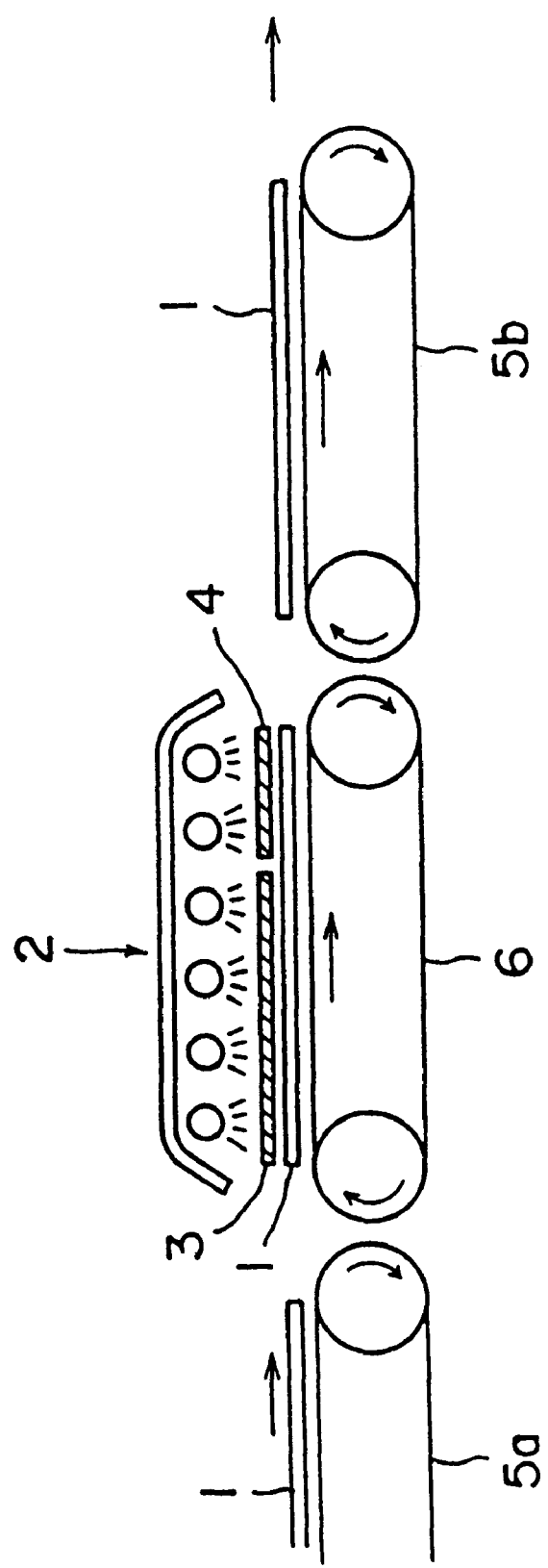
FIG. 1 schematically shows an erasing apparatus for performing the erasing method according to the invention.

FIG. 1 schematically shows an erasing apparatus for performing the erasing method of the invention. The erasing apparatus shown in FIG. 1 comprises erasing a light source (erasing lamps) 2; UV cut-filter 3 and sharp cut-filter 4; conveyor belts 5a, 5b; and an endless belt 6.

The erasing light source 2 emits a light containing at least a visible light component, preferably containing a light of the wavelength of 370–500 nm which contains no infrared light component. Examples of the erasing light sources include various fluorescent lamps, mercury lamps, metal halide lamps, and sodium lamp. Examples of the fluorescent lamps include normal fluorescent lamps (e.g., white lamp (W), warm white lamp (WW), daylight lamp (D), incandescent lamp, color-rendering incandescent-like lamp such as lamps of (W-DL), (W-SDL) and (W-EDL), and cold cathode fluorescent lamps such as green lamp (G), blue lamp (B), color-rendering white lamp (LCD). Any of these fluorescent lamps emit a light having a broad band spectrum ranging from approx. 300 nm to 750 nm. In the spectrum, there is a wide bright region around 600 nm. For example, a light emitted by a normal fluorescent lamp has intense bright lines at approx. 450 nm and 550 nm. Since these lines are suitably positioned, normal fluorescent lamps are preferably employed. A mercury lamp emits a light having several intense bright lines in the range of approx. 350 nm to 600 nm. A high pressure sodium lamp emits a broad band spectrum in 500 to 700 nm. A low pressure sodium lamp emits a line spectrum of high intensity in the vicinity of 580 nm.

The UV cut-filter 3 intercepts UV light (e.g., light of a wavelength shorter than approx. 370 nm), but allows transmission of visible light (light of a wavelength longer than UV region). An example of the UV cut-filter employable in the invention is "N-169", "N-190", and "N-113" (trade name, available from Nitto-Jushi Co., Ltd.), or a commercially available "CL-001". Among them, "N-169" and "N-190", both of which show $\lambda_{50}$ (at which the transmittance reaches 50%) in the wavelength region of 380 to 400 nm, are preferred. The sharp cut-filter 4 intercepts UV light and a portion of visible light (e.g., light of a wavelength shorter than approx. 500 nm), but allows transmission of a light of a wavelength longer than the above range. An example of the sharp cut-filter is "N-039" ([trade name], available from Nitto-Jushi Co., Ltd.).

Figure 2:
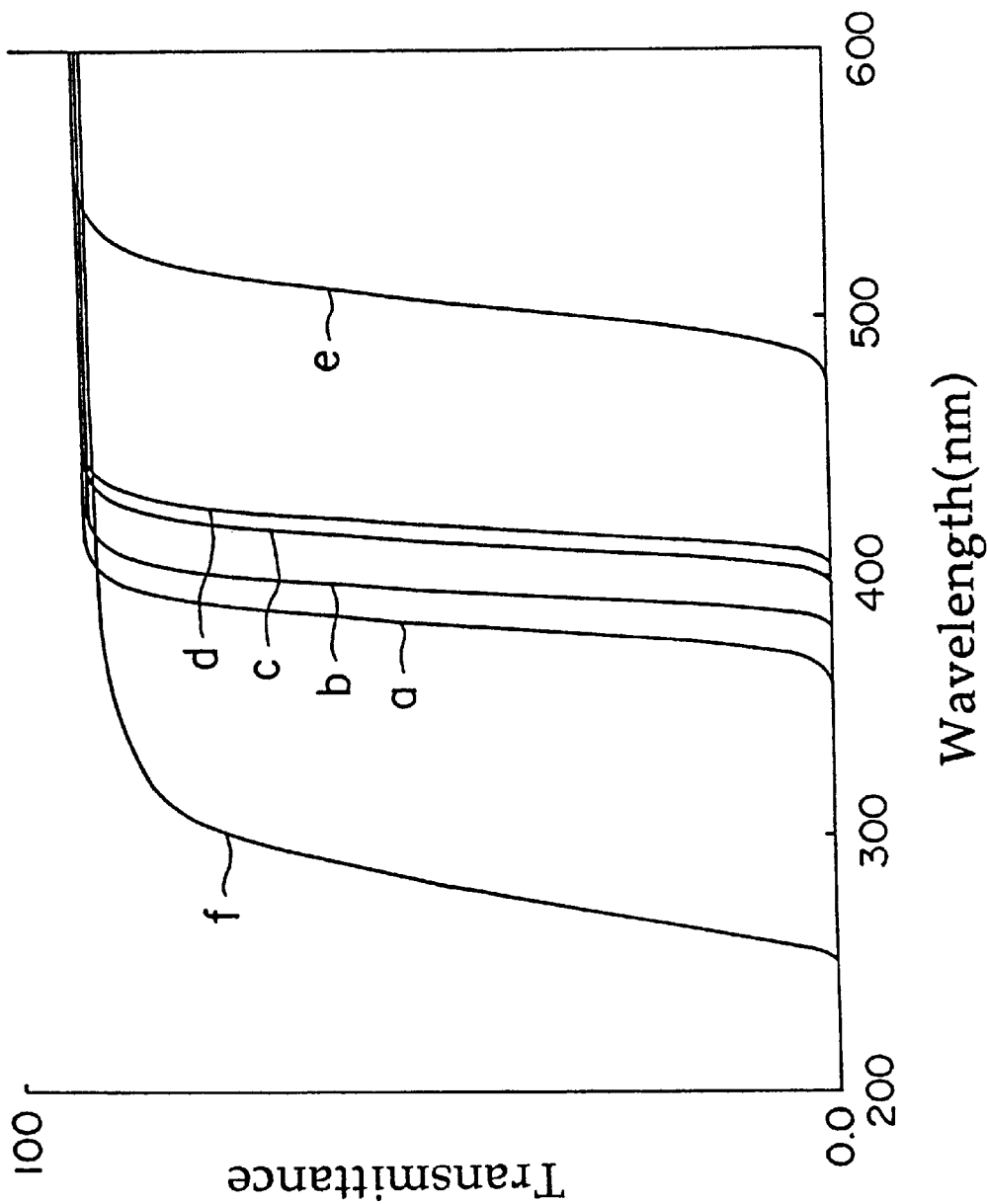
FIG. 2 is a graph indicating transmission characteristic of filters employable in the erasing method of the invention.

In FIG. 2, the transmission spectrum of each of the above-mentioned filters are shown, wherein a stands for "CL-001", b for "N-169", c for "N-190", d for "N-113", and e for "N-039". In FIG. 2, f stands for a UV light transmitting filter "W-0" which has been employed in the known first erasing step.

After the recorded radiation image was read from the stimulable phosphor sheet in the radiation image reading system, the phosphor sheet 1 is conveyed to the space under erasing light source 2 by means of a conveying roller 5a. While the phosphor sheet 1 moves in the direction of the arrow by means of an endless belt 6, the phosphor sheet 1 is exposed to a first erasing light. The first erasing light is a light emitted by the light source 2 and then transmitted through a UV cut filter (i.e., ultraviolet ray-removing filter) 3. The first erasing light contains a light of the wavelength of 370 to 500 nm but contains no light of a wavelength of shorter than 370 nm. After the irradiation by the first erasing light is complete, the phosphor sheet 1 is exposed to a second erasing light. The second erasing light is a light emitted by the light source 2 and then transmitted through a sharp cut filter 4. The second erasing light comprises a light of a wavelength of longer than 500 nm.

The stimulable phosphor sheet 1 exposed successively to the first erasing light and the second erasing light is then moved by a conveyor belt 5b from the erasing position.

The stimulable phosphor sheet exposed to the erasing light having no light component of shorter than 370 nm is kept from lowering of the sensitivity which is caused by the accumulation of energy of the repeatedly irradiated erasing light.

Moreover, the two stage-erasing procedure which utilizes the first erasing light comprising a light of the wavelength of 370 to 500 nm and the second erasing light comprising no light of the wavelength of 370 to 500 nm is very advantageous, because electrons trapped in the phosphor sheet at various levels are efficiently released so that the desired erasure of the residual radiation image can be accomplished effectively. In more detail, the electrons trapped in the phosphor sheet at a deep level is released or transferred to a shallow level by applying the first erasing light essentially comprising a light of a wavelength of longer than 370 nm. The second erasing light applied subsequently can release from the phosphor sheet not only electrons which has been originally trapped at a shallow level but also electrons which have been transferred to a shallow level by the irradiation of the first erasing light.

In the two stage-erasing procedure, the amount of the first erasing light and that of the second erasing light are preferably adjusted to give a ratio of the applied amount in the range of 15/85 to 45/55 (amount of the second erasing light/amount of first erasing light), more preferably 20/80 to 40/60. The above-specified ratio of the erasing lights is particularly effective to efficiently release electrons trapped in the phosphor sheet at various levels.

It is noted that not only energy of the radiation image remaining in the stimulable phosphor sheet but also radiation energy brought about into the phosphor sheet by environmental radiation sources can be efficiently released by the erasing procedure of the invention.

The apparatus for performing the erasing method of the invention is not restricted to that shown in FIG. 1. Any erasing apparatuses can be employed as long as the phosphor sheet is irradiated with the above-mentioned specific erasing light. For example, the light source for the first erasing light may be different from those for the second erasing light. Otherwise, a light source emitting no light of a wavelength of shorter than 370 nm such as a commercially available fluorescent lamp having a UV light-absorbing film (e.g., FL40S·W·NU) on its surface can be employed without using a UV cut filter.

Moreover, in the two stage-erasing procedure, any combinations of light sources and cut filters can be utilized, under the condition that the second erasing light contains no light of a wavelength of shorter than 370 nm and comprises a light in the wavelength of longer than that of the first erasing light.

The erasing procedure of the invention can be utilized in one erasing step using one cut filter. The erasing procedure of the invention also can be utilized for erasing the stimulable phosphor sheet by applying the erasing light on both sides of the phosphor sheet, as described in Japanese Patent Provisional Publication H7-287100.

In addition, the erasing procedure of the invention can be employed in combination with the known radiation image recording and reproducing method. For instance, the reading of the recording radiation image and the erasing the residual radiation image can be performed successively in one apparatus.

The stimulable phosphor sheet which can be processed by the erasing method of the invention has a basic structure comprising a support and a stimulable phosphor layer arranged on the support. Generally, a protective layer is placed on the stimulable phosphor layer.

As the stimulable phosphor incorporated in the phosphor layer, a phosphor giving a stimulated emission of a wavelength in the range of 300 to 500 nm when it is irradiated with stimulating rays of a wavelength in the range of 400 to 900 nm is preferably employed. In Japanese Patent Provisional Publications H2-193100 and H4-310900, some examples of the stimulable phosphor are described in detail. Examples of the preferred phosphors include halogen atom-containing stimulable phosphors such as europium or cerium activated alkaline earth metal halide phosphor, and a cerium activated oxyhalide phosphor.

EXAMPLES

A stimulable phosphor sheet comprising a plastic support and a phosphor layer provided thereon was prepared. The phosphor layer was composed of a binder and stimulable phosphor ($BaFBr_{0.85}I_{0.15}:0.005Eu^{2+}$) particles dispersed therein.

As the erasing light source, a lamp bulb color fluorescent lamp (correlated color temperature: approx. 2,800K, FPL55EX-L, available from Matsushita Electric Industry, Co., Ltd) was employed. The below-mentioned erasing procedure was performed on the stimulable phosphor sheet using each of the following acryl resin filters a to f (thickness: 1 mm), to examine variation of sensitivity and erasure characteristics.

Example 1

UV cut filter a—CL-001

Example 2

UV cut filter b—N-169

Example 3

UV cut filter c—N-190

Example 4

UV cut filter d—N-113

Comparison Ex. 1

UV transmitting filter f—W-0

The transmission spectra of these filters are illustrated in FIG. 2.

Evaluation of Sensitivity

The surface of the stimulable phosphor sheet was exposed to X-rays (80 KVp, 10 mR), and then excited with He-Ne laser light (632.8 nm) at a scanning rate of 4.6 J/m². The stimulated emission emitted by the phosphor in the phosphor sheet was collected by means of a photomultiplier to determine the amount of stimulated emission (initial stimulated emission amount). Onto the phosphor sheet stimulated as above, an erasing light which was radiated by the lamp bulb color fluorescent lamp and filtered through one of the filters a to c and f was continuously applied in an amount of 100,000 lxs (=Lux·sec) for 1 to 12 days. Then, the above-mentioned procedure of exposure to X-rays and excitation with He-Ne laser light to measure the amount of stimulated emission was performed on the phosphor sheet, after lapse of one day, four days, eight days, and twelve days, to determine decrease of the sensitivity.

Figure 3:
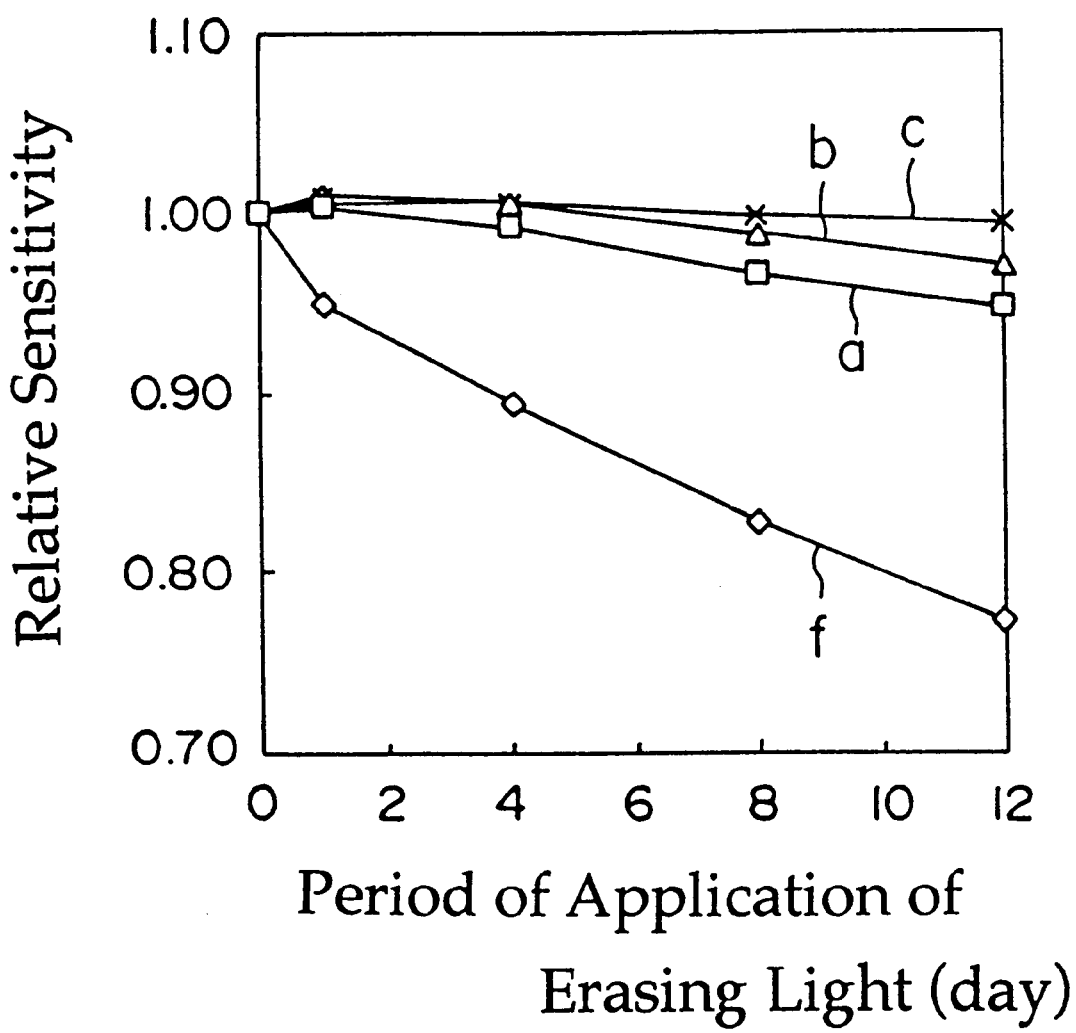
FIG. 3 is a graph indicating a relationship between an erasing period (days) and a relative sensitivity which is observed in the case of employing each of filters a, b, c and f.

The results are set forth in Table 1 and are graphically illustrated in FIG. 3, in which the values are expressed in values relative to the initial stimulated mission amount).

TABLE 1

| Filter | Relative Sensitivity | | | | |
|---|---|---|---|---|---|
| | 0 day | 1 day | 4 days | 8 days | 12 days |
| Com. Ex. 1 f(W-0) | 1.00 | 0.95 | 0.89 | 0.83 | 0.77 |
| Example 1 a(CL-001) | 1.00 | 1.00 | 0.99 | 0.97 | 0.95 |
| Example 2 b(N-169) | 1.00 | 1.01 | 1.00 | 0.99 | 0.97 |
| Example 3 c(N-190) | 1.00 | 1.01 | 1.00 | 1.00 | 0.99 |

It is apparent from the results seen in Table 1 and FIG. 3, the erasing procedure according to the present invention employing the UV cut filter a, b, or c [Examples 1 to 3] did cause almost no lowering of the sensitivity of the stimulable phosphor sheet even when the erasing light was continuously applied for a long period of time. In contrast, if the erasing light was applied to the phosphor sheet through a UV transmitting filter (f) [Comparison Example 1], the sensitivity gradually lowered in the course of the continuous application of the erasing light owing to yellowing of the surface of the phosphor sheet.

Fvaluation of Erasure Characteristics (1) Erasure Value

The surface of the stimulable phosphor sheet was exposed to X-rays (80 KVp, 1 R), and then excited with He-Ne laser light (632.8 nm) at a scanning rate of 4.6 J/m². The stimulated emission emitted by the phosphor in the phosphor sheet was collected by means of a photomulti-plier to determine the amount of stimulated emission (initial stimulated emission amount).

The above-stimulated phosphor sheet was then subjected to the two stage-erasing procedure using an erasing apparatus having the structure of FIG. 1, under the following conditions:

First erasing step:
light source: lamp bulb color fluorescent lamp
filter: a, b, c, d, or f
amount of applied light: 300,000 lxs
Second erasing step:
light source: lamp bulb color fluorescent lamp
filter: e (N-039, sharp cut filter)
amount of applied light: 200,000 lxs.

After the two stage-erasing procedure was complete, the stimulable phosphor sheet was irradiated with the laser light in the same manner as above, to measure the amount of the stimulated emission after the erasing procedure. Then, the erasure value defined by [(amount of stimulated emission after the erasing procedure)/(amount of initial stimulated emission)] was calculated.

(2) Residual Radiation Image Value (Residual Value)

The stimulable phosphor sheet which was subjected to the determination of the erasure value was allowed to stand at 60° C. for 24 hours in a dark room, and the amount of the stimulated emission was again measured in the same manner. The residual radiation image value defined by [(amount of stimulated emission after lapse of 24 hours)/(amount of initial stimulated emission)] was calculated, to evaluate reappearance of the residual radiation image.

(3) UV Fogging

The stimulable phosphor sheet which was subjected to the determination of the residual radiation image value was exposed to a white light fluorescent lamp at 200,000 lxs, and then the amount of the stimulated emission was determined. Based on these values, the UV fogging defined by [(amount of stimulated emission after exposure to fluorescent lamp)/(amount of initial stimulated emission)] was calculated to evaluate UV fogging, that is, fogging produced under daylight.

Figure 4:
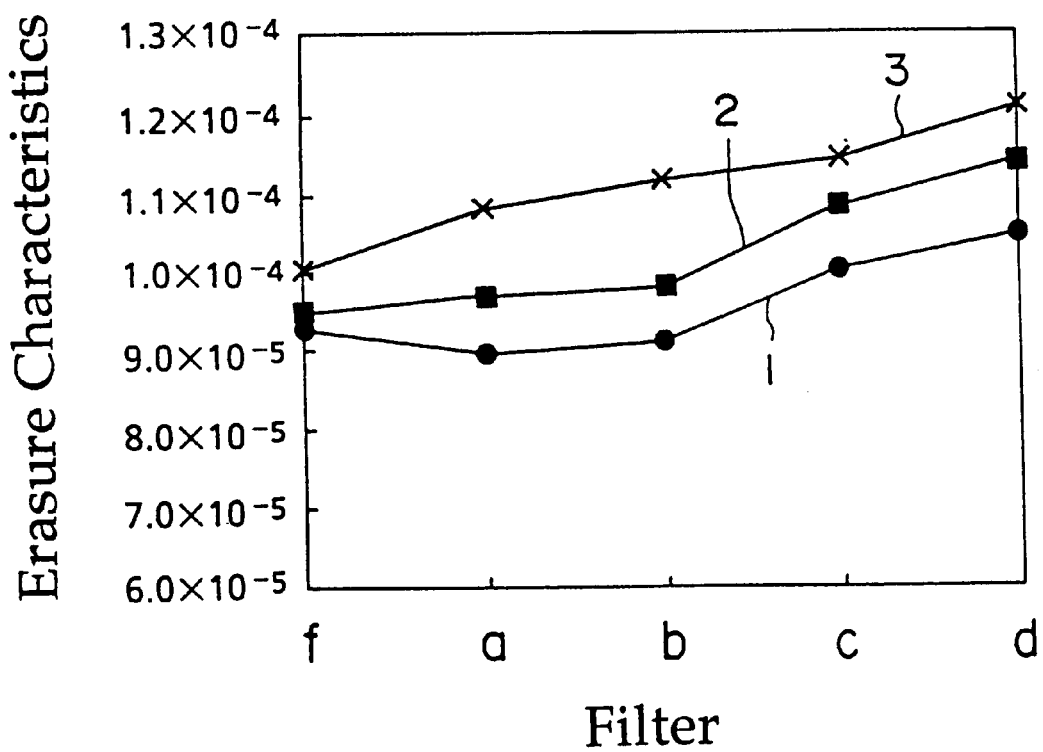
FIG. 4 is a graph indicating erasure characteristics which are observed in the case of employing each of filters a, b, c, d, and f.

The results are set forth in Table 2 and are graphically illustrated in FIG. 4. In Table 2, a relative illuminance (Relat. illum.) of the erasing light on the phosphor sheet (illuminance of the erasing light having not passed any filter is set to 100) and the wavelength at which the filter showed 50% transmittance (namely, $\lambda_{50}$) is described.

TABLE 2

| | Filter (1st) | Relat. illum. | $\lambda_{50}$ (nm) | Erasure value | Residual value | UV fogging |
|---|---|---|---|---|---|---|
| Com. 1 | f | 95.0 | 273 | $9.28 \times 10^{-5}$ | $9.50 \times 10^{-5}$ | $1.00 \times 10^{-4}$ |
| Ex. 1 | a | 95.1 | 383 | $8.95 \times 10^{-5}$ | $9.70 \times 10^{-5}$ | $1.08 \times 10^{-4}$ |
| Ex. 2 | b | 95.4 | 394 | $9.10 \times 10^{-5}$ | $9.80 \times 10^{-5}$ | $1.12 \times 10^{-4}$ |
| Ex. 3 | c | 94.2 | 412 | $1.00 \times 10^{-4}$ | $1.08 \times 10^{-4}$ | $1.15 \times 10^{-4}$ |
| Ex. 4 | d | 95.4 | 419 | $1.05 \times 10^{-4}$ | $1.14 \times 10^{-4}$ | $1.21 \times 10^{-4}$ |

In FIG. 4, the erasure characteristics given in the case of using the filter a, b, c, d, or f are graphically illustrated. In FIG. 4, polygonal line 1 indicates the erasure value, polygonal line 2 indicates the residual radiation image value, and polygonal line 3 indicates the UV fogging.

From the results shown in Table 2 and FIG. 4, it is apparent that the erasure characteristics do not lower when the first erasing step using a UV cut filter (filter a, b, c, or d) and the second erasing step using a sharp cut filter (filter e) are applied to the stimulable phosphor sheet according to the invention. Particularly, the use of the specific UV cut filter (filter a or b, in Example 1 or 2) gives a residual radiation image value almost the same level as that observed in the case of using the conventional UV transmitting filter (filter f, in Comparison Example 1), while the erasure value is improved. This means improved erasure efficiency.

What is claimed is:

1. A method for erasing a radiation image remaining in a stimulable phosphor sheet in which a radiation image was recorded and then read by applying stimulating rays onto the phosphor sheet and collecting stimulated emission from the phosphor sheet, consisting of one or more steps of applying onto the stimulable phosphor sheet an erasing light containing essentially no light of a wavelength of shorter than 370 nm.

2. The method of claim 1, wherein at least one erasing light contains a light of a wavelength region of 370 to 500 nm.

3. The method of claim 1, wherein at least one erasing light contains essentially no light of a wavelength of shorter than 500 nm.

4. The method of claim 1, wherein the one or more erasing lights are emitted by a fluorescent lamp and then transmitted through a ultraviolet ray-removing filter which cuts a light of a wavelength of shorter than 370 nm.

5. The method of claim 1, wherein the one or more erasing lights are emitted by a light source emitting neither a light of ultraviolet region nor a light of infrared region.

6. The method of claim 2, wherein the erasing is performed by two steps, in which the erasing light in the second erasing step and the erasing light in the first erasing step are applied to the phosphor sheet in a ratio of light amount of 15/85 to 45/55.

7. The method of claim 1, wherein the stimulable phosphor sheet contains a stimulable halogen-containing phosphor.

8. The method of claim 1, wherein the stimulable phosphor sheet contains a stimulable europium or cerium activated alkaline earth metal halide phosphor.

9. A method for erasing a radiation image remaining in a stimulable phosphor sheet in which a radiation image was recorded and then read by applying stimulating rays onto the phosphor sheet and collecting stimulated emission from the phosphor sheet, comprising a step of applying onto the stimulable phosphor sheet an erasing light containing essentially no light of a wavelength of shorter than 370 nm, wherein the erasing light contains a light of a wavelength region of 370 to 500 nm, and the method comprises a further step of applying onto the phosphor sheet an erasing light containing essentially no light of a wavelength of shorter than 500 nm.

* * * * *